United States Patent
Sayed et al.

(10) Patent No.: US 12,369,231 B2
(45) Date of Patent: Jul. 22, 2025

(54) AEROSOL PROVISION DEVICE

(71) Applicant: NICOVENTURES TRADING LIMITED, London (GB)

(72) Inventors: Ashley John Sayed, London (GB); Mitchel Thorsen, Madison, WI (US); Luke James Warren, London (GB); Thomas Alexander John Woodman, London (GB)

(73) Assignee: Nicoventures Trading Limited, London (GB)

( * ) Notice: Subject to any disclaimer, the term of this patent is extended or adjusted under 35 U.S.C. 154(b) by 755 days.

(21) Appl. No.: 17/593,190

(22) PCT Filed: Mar. 9, 2020

(86) PCT No.: PCT/EP2020/056243
§ 371 (c)(1),
(2) Date: Sep. 10, 2021

(87) PCT Pub. No.: WO2020/182751
PCT Pub. Date: Sep. 17, 2020

(65) Prior Publication Data
US 2022/0191979 A1 Jun. 16, 2022

Related U.S. Application Data

(60) Provisional application No. 62/816,314, filed on Mar. 11, 2019.

(51) Int. Cl.
*H05B 6/10* (2006.01)
*A24F 40/20* (2020.01)
(Continued)

(52) U.S. Cl.
CPC ............. *H05B 6/108* (2013.01); *A24F 40/20* (2020.01); *A24F 40/40* (2020.01); *A24F 40/465* (2020.01);
(Continued)

(58) Field of Classification Search
CPC ...................................... A24F 40/40
See application file for complete search history.

(56) References Cited

U.S. PATENT DOCUMENTS

| 9,089,166 B1 | 7/2015 | Scatterday |
|---|---|---|
| 9,277,770 B2 | 3/2016 | Depiano et al. |

(Continued)

FOREIGN PATENT DOCUMENTS

| CN | 2562378 Y | 7/2003 |
|---|---|---|
| CN | 203555163 U | 4/2014 |

(Continued)

OTHER PUBLICATIONS

International Search Report and Written Opinion of International Application No. PCT/EP2020/056243, mailed Jun. 2, 2020, 12 pages.

(Continued)

*Primary Examiner* — Michael H. Wilson
*Assistant Examiner* — Jennifer A Kessie
(74) *Attorney, Agent, or Firm* — Merchant & Gould P.C.

(57) ABSTRACT

An aerosol provision device includes a battery support including a main portion defining a longitudinal axis, a first end portion at a first end of the main portion along the longitudinal axis and a second end portion at a second end of the main portion along the longitudinal axis. The first and second end portions extend away from a first side of the main portion in a first direction substantially perpendicular to the longitudinal axis. The device further includes a battery supported between the first and second end portions and a (Continued)

heater assembly, comprising an inductor coil. The device further includes a printed circuit board (PCB) engaged with a second side of the main portion and positioned between the main portion and the heater assembly, wherein ends of the inductor coil are connected to the PCB.

15 Claims, 9 Drawing Sheets

(51) Int. Cl.
*A24F 40/40* (2020.01)
*A24F 40/465* (2020.01)
*H01M 50/202* (2021.01)
*H01M 50/247* (2021.01)

(52) U.S. Cl.
CPC ....... *H01M 50/202* (2021.01); *H01M 50/247* (2021.01); *H01M 2220/30* (2013.01)

(56) References Cited

U.S. PATENT DOCUMENTS

| | | | |
|---|---|---|---|
| 9,302,825 B2 | 4/2016 | Liu | |
| 9,609,893 B2 | 4/2017 | Novak et al. | |
| 9,668,522 B2 | 6/2017 | Memari et al. | |
| 9,769,878 B2 | 9/2017 | Xiang | |
| 10,034,988 B2 | 7/2018 | Wensley et al. | |
| 10,070,667 B2 | 9/2018 | Lord et al. | |
| 10,236,708 B2 | 3/2019 | Schennum et al. | |
| 10,244,793 B2 | 4/2019 | Monsees et al. | |
| 10,279,934 B2 | 5/2019 | Christensen et al. | |
| 10,285,444 B2 | 5/2019 | Clemens et al. | |
| 10,343,818 B2 | 7/2019 | Murphy et al. | |
| 10,405,582 B2 | 9/2019 | Hatton et al. | |
| 10,412,994 B2 | 9/2019 | Schennum et al. | |
| 10,433,584 B2 | 10/2019 | Nettenstrom et al. | |
| 10,595,561 B2 | 3/2020 | Depiano et al. | |
| 10,667,561 B2 | 6/2020 | Verleur et al. | |
| 10,701,972 B2 | 7/2020 | Biel et al. | |
| 10,701,975 B2 | 7/2020 | Bowen et al. | |
| 10,709,173 B2 | 7/2020 | Monsees et al. | |
| 10,750,779 B2 | 8/2020 | Schennum et al. | |
| 10,931,130 B2 | 2/2021 | Akao | |
| 10,945,457 B2 | 3/2021 | Sur | |
| 11,134,722 B2 | 10/2021 | Verleur et al. | |
| 11,234,463 B2 | 2/2022 | Depiano et al. | |
| 11,425,936 B2 | 8/2022 | Otiaba et al. | |
| 11,432,589 B2 | 9/2022 | Otiaba et al. | |
| 11,458,265 B2 | 10/2022 | Brammer et al. | |
| 2003/0190837 A1* | 10/2003 | Wu | H01M 50/50 439/500 |
| 2014/0053858 A1 | 2/2014 | Liu | |
| 2014/0283825 A1 | 9/2014 | Buchberger | |
| 2015/0101622 A1 | 4/2015 | Liu | |
| 2015/0114409 A1 | 4/2015 | Brammer et al. | |
| 2015/0282527 A1 | 10/2015 | Henry | |
| 2015/0305409 A1 | 10/2015 | Verleur et al. | |
| 2015/0366267 A1 | 12/2015 | Liu | |
| 2016/0286857 A1* | 10/2016 | Liu | H01M 50/224 |
| 2016/0366942 A1 | 12/2016 | Liu | |
| 2017/0027228 A1* | 2/2017 | Rastogi | A24F 40/40 |
| 2018/0056016 A1 | 3/2018 | Qiu | |
| 2018/0360119 A1 | 12/2018 | Kuwa et al. | |
| 2018/0360120 A1 | 12/2018 | Huang et al. | |
| 2023/0285694 A1 | 9/2023 | Buchberger | |

FOREIGN PATENT DOCUMENTS

| | | |
|---|---|---|
| CN | 204560964 U | 8/2015 |
| CN | 106343611 A | 1/2017 |
| CN | 107536113 A | 1/2018 |
| CN | 206866628 U | 1/2018 |
| CN | 108308723 A | 7/2018 |
| CN | 109076650 A | 12/2018 |
| CN | 109315836 A | 2/2019 |
| EP | 1989946 A1 | 11/2008 |
| JP | 2014512207 A | 5/2014 |
| JP | 2015516809 A | 6/2015 |
| JP | 2017127300 A | 7/2017 |
| JP | 2017225357 A | 12/2017 |
| WO | 2015077645 A1 | 5/2015 |
| WO | 2017163052 A1 | 9/2017 |
| WO | 2018073376 A1 | 4/2018 |
| WO | 2019232086 A1 | 12/2019 |

OTHER PUBLICATIONS

"Decision of Refusal received for Japanese Patent Application No. 2021-554592 mailed on May 16, 2023", 6 pages (3 pages of English Translation and 3 pages of Official Copy).

"International Preliminary Report on Patentability received for PCT Patent Application No. PCT/EP2020/056243, mailed on Sep. 23, 2021", 8 pages.

"International Preliminary Report on Patentability received for PCT Patent Application No. PCT/EP2020/056245, mailed on Sep. 23, 2021", 11 pages.

"International Search Report and Written Opinion received for PCT Patent Application No. PCT/EP2020/056245, mailed on Sep. 7, 2020", 16 pages.

"Invitation to Pay Additional Fees received for PCT Patent Application No. PCT/EP2020/056245, mailed on May 29, 2020", 10 pages.

"Office Action received for Australian Patent Application No. 2020235043, mailed on Jun. 30, 2022", 4 pages.

"Office Action received for Chinese Patent Application No. 202080033336.1, mailed on Jun. 29, 2023", 7 pages (Official Copy Only).

"Office Action received for Russian Patent Application No. 2021126654, mailed on Jun. 8, 2022", 15 pages.

"Reasons for Refusal received for Japanese Patent Application No. 2021-554592, mailed on Jan. 10, 2023", 10 pages (5 pages of English Translation and 5 pages of Official Copy).

\* cited by examiner

US 12,369,231 B2

AEROSOL PROVISION DEVICE

PRIORITY CLAIM

The present application is a National Phase entry of PCT Application No. PCT/EP2020/056243, filed Mar. 9, 2020, which claims priority from U.S. Provisional Application No. 62/816,314, filed Mar. 11, 2019, each of which is hereby fully incorporated herein by reference.

TECHNICAL FIELD

The present disclosure relates to an aerosol provision device and a battery support for an aerosol provision device.

BACKGROUND

Smoking articles such as cigarettes, cigars and the like burn tobacco during use to create tobacco smoke. Attempts have been made to provide alternatives to these articles that burn tobacco by creating products that release compounds without burning. Examples of such products are heating devices which release compounds by heating, but not burning, the material. The material may be for example tobacco or other non-tobacco products, which may or may not contain nicotine.

SUMMARY

According to a first aspect of the present disclosure, there is provided an aerosol provision device. The aerosol provision device can include a battery support, comprising: a main portion defining a longitudinal axis, a first end portion at a first end of the main portion along the longitudinal axis, and a second end portion at a second end of the main portion along the longitudinal axis, wherein the first and second end portions extend away from a first side of the main portion in a first direction substantially perpendicular to the longitudinal axis. The aerosol provision device can further include a battery supported between the first and second end portions, a heater assembly, comprising a coil, and a printed circuit board (PCB) engaged with a second side of the main portion and positioned between the main portion and the heater assembly, wherein ends of the coil are connected to the PCB.

According to a second aspect of the present disclosure, there is provided a battery support for an aerosol provision device, comprising: a main portion defining a longitudinal axis, a first end portion arranged at a first end of the first main portion along the longitudinal axis, and a second end portion arranged at a second end of the first main portion along the longitudinal axis, wherein the first and second end portions extend away from a first side of the main portion in a first direction substantially perpendicular to the longitudinal axis, wherein the first and second end portions are configured to receive a battery therebetween and a second side of the main portion is configured to engage with a printed circuit board (PCB).

Further features and advantages of the present disclosure will become apparent from the following description of embodiments, given by way of example only, which is made with reference to the accompanying drawings.

DETAILED DESCRIPTION

Figure 1:
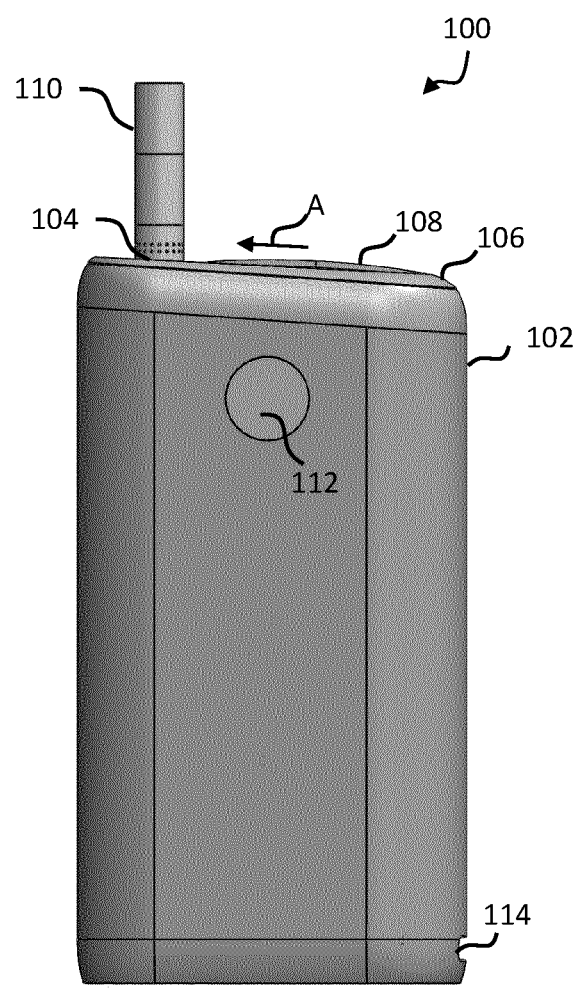
FIG. 1 shows a front view of an example of an aerosol provision device according to an embodiment.

As used herein, the term "aerosol generating material" includes materials that provide volatilized components upon heating, typically in the form of an aerosol. Aerosol generating material includes any tobacco-containing material and may, for example, include one or more of tobacco, tobacco derivatives, expanded tobacco, reconstituted tobacco or tobacco substitutes. Aerosol generating material also may include other, non-tobacco, products, which, depending on the product, may or may not contain nicotine. Aerosol generating material may for example be in the form of a solid, a liquid, a gel, a wax or the like. Aerosol generating material may for example also be a combination or a blend of materials. Aerosol generating material may also be known as "smokable material".

Apparatus is known that heats aerosol generating material to volatilize at least one component of the aerosol generating material, typically to form an aerosol which can be inhaled, without burning or combusting the aerosol generating material. Such apparatus is sometimes described as an "aerosol generating device", an "aerosol provision device", a "heat-not-burn device", a "tobacco heating product device" or a "tobacco heating device" or similar. Similarly, there are also so-called e-cigarette devices, which typically vaporize an aerosol generating material in the form of a liquid, which may or may not contain nicotine. The aerosol generating material may be in the form of or be provided as part of a rod, cartridge or cassette or the like which can be inserted into the apparatus. A heater for heating and volatilizing the aerosol generating material may be provided as a "permanent" part of the apparatus.

An aerosol provision device can receive an article comprising aerosol generating material for heating. An "article" in this context is a component that includes or contains in use the aerosol generating material, which is heated to volatilize the aerosol generating material, and optionally other components in use. A user may insert the article into the aerosol provision device before it is heated to produce an aerosol, which the user subsequently inhales. The article may be, for example, of a predetermined or specific size that is configured to be placed within a heating chamber of the device which is sized to receive the article.

A first aspect of the present disclosure defines an aerosol provision device comprising battery support. The battery support comprises a main portion, a first end portion and a second end portion. The first and second end portions extend away from a first side of the main portion and receive a battery therebetween. A printed circuit board (PCB) engages a second side of the main portion, and is positioned between the main portion and a heater assembly. The heater assembly comprises at least one coil, and ends of the at least one coil are connected to the PCB. The battery support therefore not only supports the battery to hold it in place, but also acts as a support to which other components of the device can be attached and connected. Such a battery support provides stability to the device. In addition, the process of assembling the device can also be simplified; the various components can be attached to the battery support during assembly of the device. The device can therefore be assembled starting from the battery support.

In certain arrangements the battery support is rigid for stability. In an example, the battery support is made from a plastic material, such as polyether ether ketone (PEEK). Any material used should be able to withstand the heat generated by the heater assembly. In a particular example the heater assembly comprises a susceptor which is heated to about 250-300° C. The melting point of PEEK is around 343° C.

In certain arrangements the battery support is electrically insulating to avoid shorting the battery.

As mentioned, the PCB is engaged with the second side of the main portion of the battery support. Engagement can be through a connection, such as bonding, snap-fit etc., or by being received on the second side.

The first side of the main portion may define a receptacle and may comprise a base portion and two opposing side walls. The two side walls may extend along a length of the base portion in a direction parallel to the longitudinal axis and extend away from the base portion in the first direction. The battery can be arranged in the receptacle between the first and second end portions and the two side walls. In such an arrangement, the side walls can protect the sides of the battery from impact, for example, and/or provide further rigidity. The length of the base portion is measured in a direction parallel to the longitudinal axis.

In some examples, at least part of the two side walls abut the battery. For example, edges of the side walls may abut the battery. By being in contact with the side walls, the battery is held more firmly in place to avoid or reduce lateral movement of the battery.

In a particular arrangement, the two side walls each comprise edges that are shaped to conform to an outer surface of the battery, and the edges abut the battery. For example, the edges may be curved to conform to a curved outer surface of the battery. This allows the battery to be supported more securely.

The base portion may delimit an opening between the first side of the main portion and the second side of the main portion, and the opening is positioned beneath the PCB. Thus, there is a hole/cut-out through the main portion. This can allow better thermal management. For example, the opening allows air to circulate beneath the PCB. In addition, the opening means that less material is used which reduces the mass of the device and reduces costs. Furthermore, the opening can make it easier to assemble and connect components to the PCB. For example, the PCB can be mounted onto the main portion, and the opening allows the underside of the PCB to be accessed while the PCB is being held in place. The opening also allows components to be mounted on both sides of the PCB.

The device may further comprise a first electrically conductive member in contact with a first battery terminal, and a second electrically conductive member in contact with a second battery terminal. The first and second electrically conductive members can extend through the opening, and be connected to the PCB. The electrically conductive members may be wires or conductive strips which connect the battery to the PCB and/or other components of the device. The first and second terminals can be positive or negative terminals or vice versa. The opening therefore makes it easier to connect the battery to the PCB because there is no need to route the conductive members around the battery carrier. This arrangement therefore also allows the device to be made more compact, and reduces the likelihood of shorting the battery by reducing the length of the conductive members.

The PCB may delimit a first through hole through which the first electrically conductive member extends. The PCB may further delimit a second through hole through which the second electrically conductive member extends. Thus, the PCB may delimit one or more through holes to receive one or more ends of the electrically conductive members. This can allow the battery to be connected to the other side of the PCB without requiring the electrically conductive members to be routed around the PCB and/or the battery carrier. Thus, the space within the device can be maximized. In addition, the through holes can also enable a more secure attachment to the PCB.

The device may further comprise an end member. The end member: (i) defines a receptacle, (ii) comprises a first attachment element, and (iii) comprises an end surface which defines part of an outer surface of the aerosol provision device. The second end portion of the battery support and at least part of the heater assembly are positioned within the receptacle. The battery support may also comprise a second attachment element engaged with the first attachment element, such that the end member is connected to one end of the battery support.

The battery support therefore comprises an attachment element configured to engage with a corresponding attachment element of the end member to allow the end member to be connected to the battery support. The end member provides protection to the end of the device, and can help support and secure the heater assembly.

In a particular arrangement, the main portion comprises the second attachment element. The attachment element may also be known as an attachment feature, component, or member.

In one example, the first and second attachment elements provide a snap-fit connection. For example, the second attachment element may include a channel extending in a direction parallel to the longitudinal axis and a first surface arranged at one end of the channel, wherein the first surface defines a plane arranged perpendicular to the longitudinal axis. Similarly, the first attachment element may include an elongate portion extending away from the end surface and a second surface arranged towards one end of the elongate portion, wherein the second surface defines a plane arranged perpendicular to the longitudinal axis and the elongate portion is received within the channel and the first surface and the second surface engage.

Thus, the two surfaces abut when the first and second attachment elements are fitted together. The surfaces stop the end member moving relative to the battery support in a direction parallel to the longitudinal axis. The channel stops the end member moving relative to the battery support in a direction perpendicular to the longitudinal axis. The elongate portion resides in the channel, thereby providing an attachment mechanism having a low profile. The channel may be provided by two inclined side walls which are spaced apart. The inclined side walls force the elongate portion outwards, which then "snaps" back into position before the two surfaces engage.

In a particular arrangement the first attachment element is substantially "T" shaped, where the underside of the horizontal bar in the "T" provides the second surface, and the upright part of the "T" provides the elongate portion.

In some examples the battery support comprises a third attachment element and the end member comprises a fourth attachment element engaged with the third attachment element.

The device may further comprise an outer cover, and the end member may further comprise one or more side surfaces extending away from the end surface. The outer cover can surround the battery, the heater assembly, the battery support, and the one or more side surfaces of the end member.

The outer cover can therefore also be supported by the battery support. In example devices which comprise the attachment elements having the elongate portion and the channel, the outer cover helps secure the connection between the battery support and the end member. For example, the outer cover holds the elongate portion in the channel, and therefore holds the first and second surfaces in the engaged position.

In one example the outer cover abuts the one or more side surfaces of the end member. In a particular arrangement, the device may comprise a second end member arranged at the other end of the device, such that the outer cover is received between the two end members.

The second side of the main portion may comprise a first PCB retaining member and a second PCB retaining member, wherein the first and second PCB retaining members: (i) both extend away from the second side of the main portion in a second direction which is opposite to the first direction and (ii) are arranged on opposite sides of the main portion, and engage opposite sides of the PCB. The second direction is perpendicular to the longitudinal axis.

The first and second PCB retaining members provide stability by stopping movement of the PCB relative to the battery support.

In some arrangements the PCB retaining members provide an interference fit.

The PCB may comprise a first notch to receive the first PCB retaining member, and a second notch to receive the second PCB retaining member. The notches can therefore restrict movement of the PCB in a direction parallel to the axis.

The PCB may delimit first and second coil through holes, wherein a first end of the coil extends through the first coil through hole, and a second end of the coil extends through the second coil through hole. The coil through holes allow a more secure and robust attachment of the coil to the PCB. For example, if the coil is soldered to the PCB, there is less stress exerted on the solder.

In one arrangement the main portion comprises first and second connectors extending away from one of the first end portion and the second end portion in a direction parallel to the longitudinal axis. The device may further comprise a second PCB, wherein the second PCB delimits first and second connector through holes, and the first connector extends through the first connector through hole, and the second connector extends through the second connector through hole.

The second PCB can therefore be connected to the battery support via the first and second connectors. In one example the first and second connectors are configured to be heated until they melt once they have been received in the first and second connector holes. Melting ends of the first and second connectors means that the second PCB cannot be removed.

The second PCB may be connected to the first PCB. The second PCB can be arranged substantially perpendicular to the first PCB.

In some examples, the coil(s) is/are configured to, in use, cause heating of at least one electrically-conductive heating component/element (also known as a heater component/element), so that heat energy is conductible from the at least one electrically-conductive heating component to aerosol generating material to thereby cause heating of the aerosol generating material.

In some examples, the coil(s) is/are configured to generate, in use, a varying magnetic field for penetrating at least one heating component/element, to thereby cause induction heating and/or magnetic hysteresis heating of the at least one heating component. In such an arrangement, the (or each) heating component may be termed a "susceptor". A coil that is configured to generate, in use, a varying magnetic field for penetrating at least one electrically-conductive heating component, to thereby cause induction heating of the at least one electrically-conductive heating component, may be termed an "induction coil" or "inductor coil".

The device may include the heating component(s), for example electrically-conductive heating component(s), and the heating component(s) may be suitably located or locatable relative to the coil(s) to enable such heating of the heating component(s). The heating component(s) may be in a fixed position relative to the coil(s). Alternatively, the at least one heating component, for example at least one electrically-conductive heating component, may be included in an article for insertion into a heating zone of the device, wherein the article also comprises the aerosol generating material and is removable from the heating zone after use. Alternatively, both the device and such an article may comprise at least one respective heating component, for example at least one electrically-conductive heating component, and the coil(s) may be to cause heating of the heating component(s) of each of the device and the article when the article is in the heating zone.

In some examples, the coil(s) is/are helical. In some examples, the coil(s) encircles at least a part of a heating zone of the device that is configured to receive aerosol generating material. In some examples, the coil(s) is/are helical coil(s) that encircles at least a part of the heating zone. The heating zone may be a receptacle, shaped to receive the aerosol generating material.

In some examples, the device comprises an electrically-conductive heating component that at least partially surrounds the heating zone, and the coil(s) is/are helical coil(s) that encircles at least a part of the electrically-conductive heating component. In some examples, the electrically-conductive heating component is tubular. In some examples, the coil is an inductor coil.

In embodiments, the device is a tobacco heating device, also known as a heat-not-burn device.

FIG. 1 shows an example of an aerosol provision device 100 for generating aerosol from an aerosol generating medium/material. In broad outline, the device 100 may be used to heat a replaceable article 110 comprising the aerosol generating medium, to generate an aerosol or other inhalable medium which is inhaled by a user of the device 100.

The device 100 comprises a housing 102 (in the form of an outer cover) which surrounds and houses various components of the device 100. The device 100 has an opening 104 in one end, through which the article 110 may be inserted for heating by a heating assembly. In use, the article 110 may be fully or partially inserted into the heating assembly where it may be heated by one or more components of the heater assembly.

The device 100 of this example comprises a first end member 106 which comprises a lid 108 which is moveable relative to the first end member 106 to close the opening 104 when no article 110 is in place. In FIG. 1, the lid 108 is shown in an open configuration, however the cap 108 may move into a closed configuration. For example, a user may cause the lid 108 to slide in the direction of arrow "A".

The device 100 may also include a user-operable control element 112, such as a button or switch, which operates the device 100 when pressed. For example, a user may turn on the device 100 by operating the switch 112.

The device 100 may also comprise an electrical component, such as a socket/port 114, which can receive a cable to charge a battery of the device 100. For example, the socket 114 may be a charging port, such as a USB charging port. In some examples the socket 114 may be used additionally or alternatively to transfer data between the device 100 and another device, such as a computing device.

Figure 2:
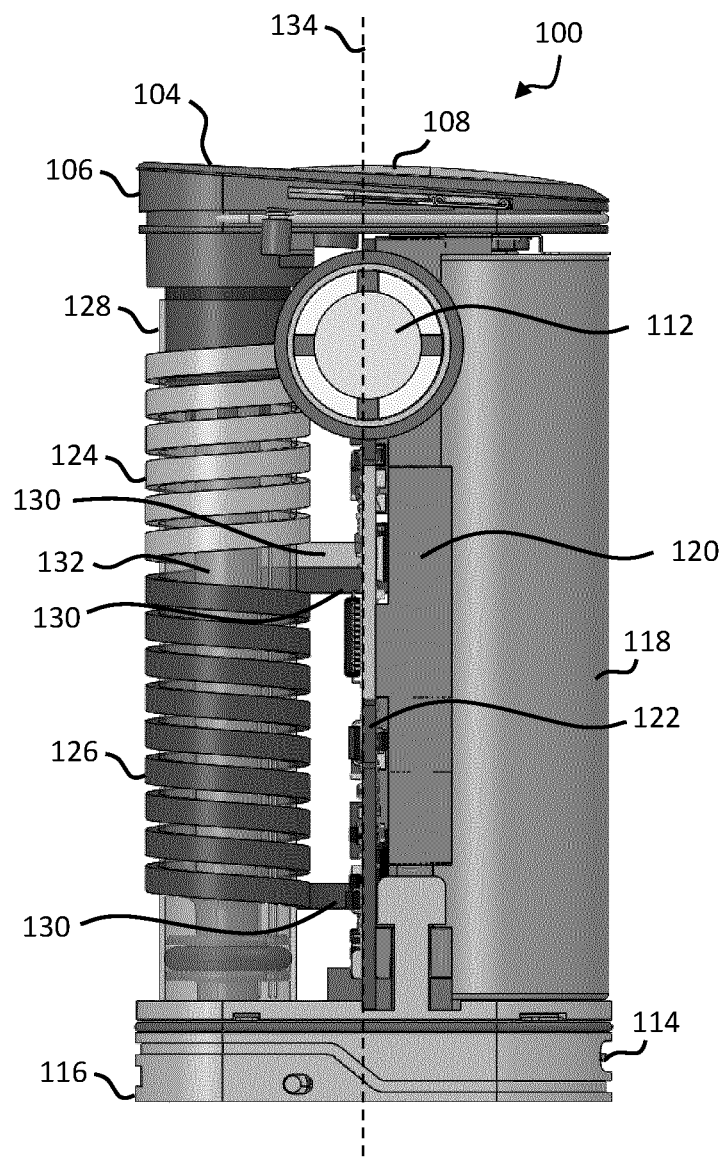
FIG. 2 shows a front view of the aerosol provision device of FIG. 1 with an outer cover removed.

FIG. 2 depicts the device 100 of FIG. 1 with the outer cover 102 removed and without an article 110 present. The device 100 defines a longitudinal axis 134.

As shown in FIG. 2, the first end member 106 is arranged at one end of the device 100 and a second end member 116 is arranged at an opposite end of the device 100. The first and second end members 106, 116 together at least partially define end surfaces of the device 100. For example, the bottom surface of the second end member 116 at least partially defines a bottom surface of the device 100. Edges of the outer cover 102 may also define a portion of the end surfaces. In this example, the lid 108 also defines a portion of a top surface of the device 100.

The end of the device closest to the opening 104 may be known as the proximal end (or mouth end) of the device 100 because, in use, it is closest to the mouth of the user. In use, a user inserts an article 110 into the opening 104, operates the user control 112 to begin heating the aerosol generating material and draws on the aerosol generated in the device. This causes the aerosol to flow through the device 100 along a flow path towards the proximal end of the device 100.

The other end of the device furthest away from the opening 104 may be known as the distal end of the device 100 because, in use, it is the end furthest away from the mouth of the user. As a user draws on the aerosol generated in the device, the aerosol flows away from the distal end of the device 100.

The device 100 further comprises a power source 118. The power source 118 may be, for example, a battery, such as a rechargeable battery or a non-rechargeable battery. Examples of suitable batteries include, for example, a lithium battery (such as a lithium-ion battery), a nickel battery (such as a nickel-cadmium battery), and an alkaline battery. The battery is electrically coupled to the heating assembly to supply electrical power when required and under control of a controller (not shown) to heat the aerosol generating material. In this example, the battery is connected to a central support 120 which holds the battery 118 in place. The central support 120 may also be known as a battery support, or battery carrier.

The device further comprises at least one electronics module 122. The electronics module 122 may comprise, for example, a printed circuit board (PCB). The PCB 122 may support at least one controller, such as a processor, and memory. The PCB 122 may also comprise one or more electrical tracks to electrically connect together various electronic components of the device 100. For example, the battery terminals may be electrically connected to the PCB 122 so that power can be distributed throughout the device 100. The socket 114 may also be electrically coupled to the battery via the electrical tracks.

In the example device 100, the heating assembly is an inductive heating assembly and comprises various components to heat the aerosol generating material of the article 110 via an inductive heating process. Induction heating is a process of heating an electrically conducting object (such as a susceptor) by electromagnetic induction. An induction heating assembly may comprise an inductive element, for example, one or more inductor coils, and a device for passing a varying electric current, such as an alternating electric current, through the inductive element. The varying electric current in the inductive element produces a varying magnetic field. The varying magnetic field penetrates a susceptor suitably positioned with respect to the inductive element, and generates eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field. In inductive heating, as compared to heating by conduction for example, heat is generated inside the susceptor, allowing for rapid heating. Further, there need not be any physical contact between the inductive heater and the susceptor, allowing for enhanced freedom in construction and application.

The induction heating assembly of the example device 100 comprises a susceptor arrangement 132 (herein referred to as "a susceptor"), a first inductor coil 124 and a second inductor coil 126. The first and second inductor coils 124, 126 are made from an electrically conducting material. In this example, the first and second inductor coils 124, 126 are made from Litz wire/cable which is wound in a helical fashion to provide helical inductor coils 124, 126. Litz wire comprises a plurality of individual wires which are individually insulated and are twisted together to form a single wire. Litz wires are designed to reduce the skin effect losses in a conductor. In the example device 100, the first and second inductor coils 124, 126 are made from copper Litz wire which has a rectangular cross section. In other examples the Litz wire can have other shape cross sections, such as circular.

The first inductor coil 124 is configured to generate a first varying magnetic field for heating a first section of the susceptor 132 and the second inductor coil 126 is configured to generate a second varying magnetic field for heating a second section of the susceptor 132. In this example, the first inductor coil 124 is adjacent to the second inductor coil 126 in a direction along the longitudinal axis 134 of the device 100 (that is, the first and second inductor coils 124, 126 to not overlap). The susceptor arrangement 132 may comprise a single susceptor, or two or more separate susceptors. Ends 130 of the first and second inductor coils 124, 126 can be connected to the PCB 122.

It will be appreciated that the first and second inductor coils 124, 126, in some examples, may have at least one characteristic different from each other. For example, the first inductor coil 124 may have at least one characteristic different from the second inductor coil 126. More specifically, in one example, the first inductor coil 124 may have a different value of inductance than the second inductor coil 126. In FIG. 2, the first and second inductor coils 124, 126 are of different lengths such that the first inductor coil 124 is wound over a smaller section of the susceptor 132 than the second inductor coil 126. Thus, the first inductor coil 124 may comprise a different number of turns than the second inductor coil 126 (assuming that the spacing between individual turns is substantially the same). In yet another example, the first inductor coil 124 may be made from a different material to the second inductor coil 126. In some examples, the first and second inductor coils 124, 126 may be substantially identical. In this example, the first inductor coil 124 and the second inductor coil 126 are wound in opposite directions. This can be useful when the inductor coils are active at different times. For example, initially, the first inductor coil 124 may be operating to heat a first section of the article 110, and at a later time, the second inductor coil 126 may be operating to heat a second section of the article 110. Winding the coils in opposite directions helps reduce the current induced in the inactive coil when used in conjunction with a particular type of control circuit. In FIG. 2, the first inductor coil 124 is a right-hand helix and the second inductor coil 126 is a left-hand helix. However, in another embodiment, the inductor coils 124, 126 may be wound in the same direction, or the first inductor coil 124 may be a left-hand helix and the second inductor coil 126 may be a right-hand helix.

The susceptor 132 of this example is hollow and therefore defines a receptacle within which aerosol generating material is received. For example, the article 110 can be inserted into the susceptor 132. In this example the susceptor 120 is tubular, with a circular cross section.

The device 100 of FIG. 2 further comprises an insulating member 128 which may be generally tubular and at least partially surround the susceptor 132. The insulating member 128 may be constructed from any insulating material, such as plastic for example. In this particular example, the insulating member is constructed from polyether ether ketone (PEEK). The insulating member 128 may help insulate the various components of the device 100 from the heat generated in the susceptor 132.

The insulating member 128 can also fully or partially support the first and second inductor coils 124, 126. For example, as shown in FIG. 2, the first and second inductor coils 124, 126 are positioned around the insulating member 128 and are in contact with a radially outward surface of the insulating member 128. In some examples the insulating member 128 does not abut the first and second inductor coils 124, 126. For example, a small gap may be present between the outer surface of the insulating member 128 and the inner surface of the first and second inductor coils 124, 126.

In a specific example, the susceptor 132, the insulating member 128, and the first and second inductor coils 124, 126 are coaxial around a central longitudinal axis of the susceptor 132.

Figure 3:
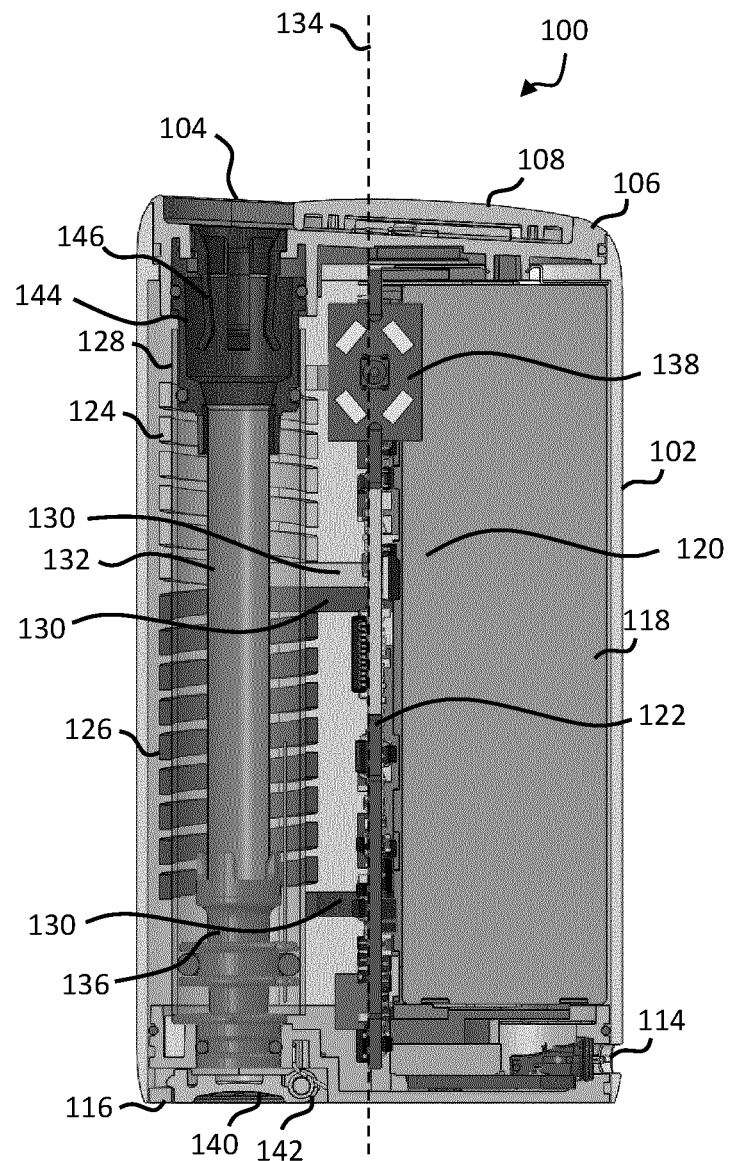
FIG. 3 shows a cross-sectional view of the aerosol provision device of FIG. 1.

FIG. 3 shows a side view of device 100 in partial cross-section. The outer cover 102 is present in this example. The rectangular cross-sectional shape of the first and second inductor coils 124, 126 is more clearly visible.

The device 100 further comprises a support 136 which engages one end of the susceptor 132 to hold the susceptor 132 in place. The support 136 is connected to the second end member 116.

The device may also comprise a second printed circuit board 138 associated within the control element 112.

The device 100 further comprises a second lid/cap 140 and a spring 142, arranged towards the distal end of the device 100. The spring 142 allows the second lid 140 to be opened, to provide access to the susceptor 132. A user may open the second lid 140 to clean the susceptor 132 and/or the support 136.

The device 100 further comprises an expansion chamber 144 which extends away from a proximal end of the susceptor 132 towards the opening 104 of the device. Located at least partially within the expansion chamber 144 is a retention clip 146 to abut and hold the article 110 when received within the device 100. The expansion chamber 144 is connected to the end member 106.

Figure 4:
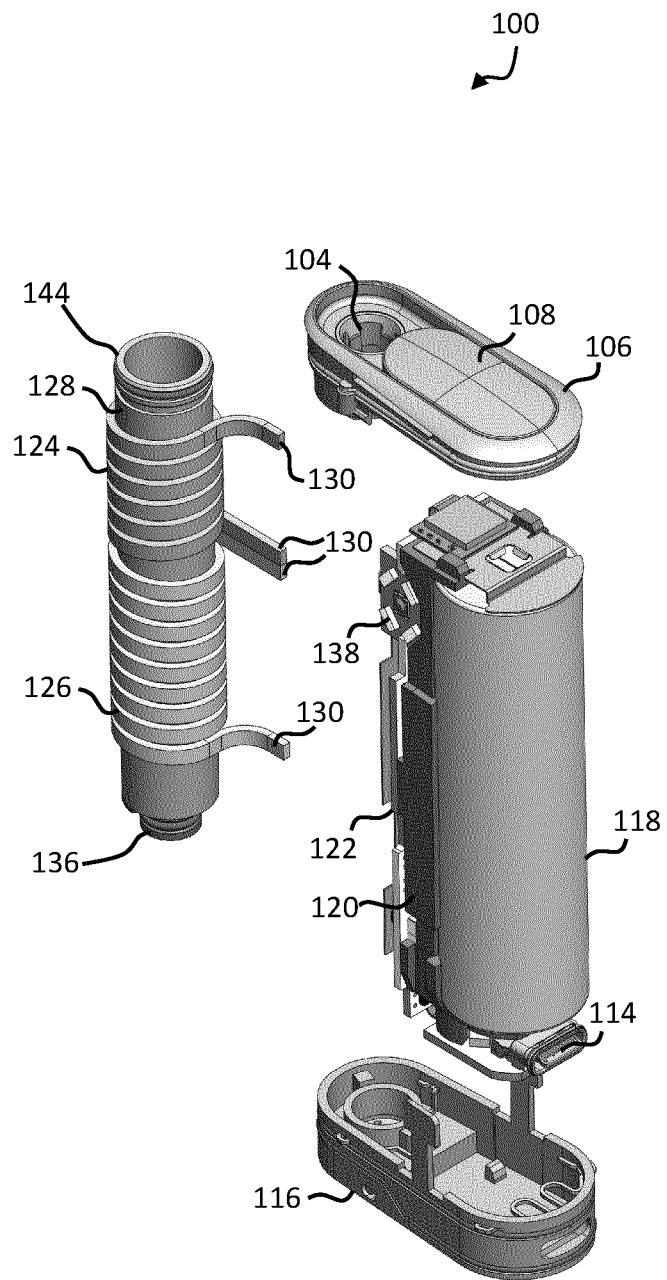
FIG. 4 shows an exploded view of the aerosol provision device of FIG. 2.

FIG. 4 is an exploded view of the device 100 of FIG. 1, with the outer cover 102 omitted.

Figures 5A, 5B:
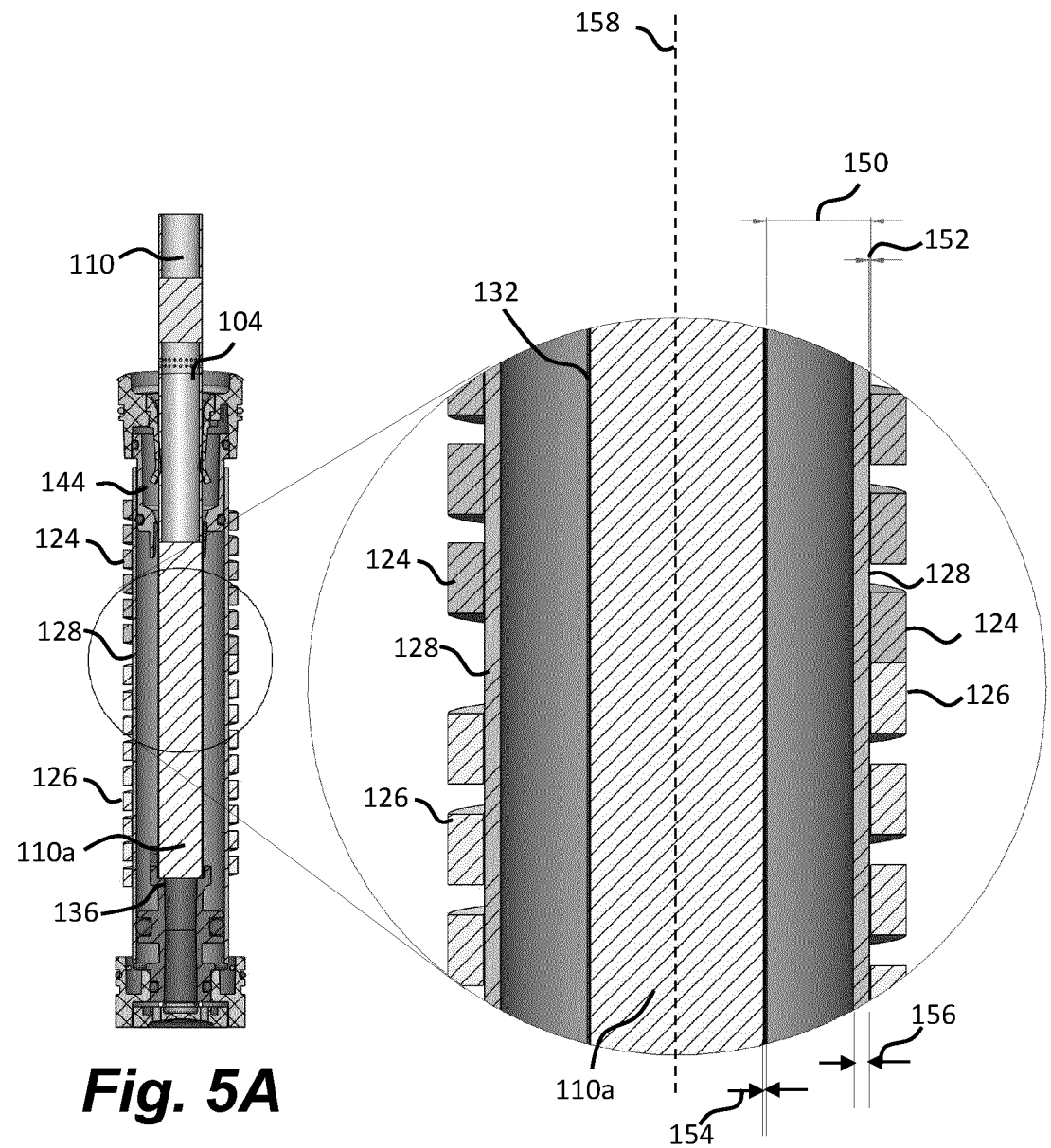
FIG. 5A shows a cross-sectional view of a heating assembly within an aerosol provision device according to an embodiment.
FIG. 5B shows a close-up view of a portion of the heating assembly of FIG. 5A.

FIG. 5A depicts a cross section of a portion of the device 100 of FIG. 1. FIG. 5B depicts a close-up of a region of FIG. 5A. FIGS. 5A and 5B show the article 110 received within the susceptor 132, where the article 110 is dimensioned so that the outer surface of the article 110 abuts the inner surface of the susceptor 132. This ensures that the heating is most efficient. The article 110 of this example comprises aerosol generating material 110a. The aerosol generating material 110a is positioned within the susceptor 132. The article 110 may also comprise other components such as a filter, wrapping materials and/or a cooling structure.

FIG. 5B shows that the outer surface of the susceptor 132 is spaced apart from the inner surface of the inductor coils 124, 126 by a distance 150, measured in a direction perpendicular to a longitudinal axis 158 of the susceptor 132. In one particular example, the distance 150 is about 3 mm to 4 mm, about 3-3.5 mm, or about 3.25 mm.

FIG. 5B further shows that the outer surface of the insulating member 128 is spaced apart from the inner surface of the inductor coils 124, 126 by a distance 152, measured in a direction perpendicular to a longitudinal axis 158 of the susceptor 132. In one particular example, the distance 152 is about 0.05 mm. In another example, the distance 152 is substantially 0 mm, such that the inductor coils 124, 126 abut and touch the insulating member 128.

In one example, the susceptor 132 has a wall thickness 154 of about 0.025 mm to 1 mm, or about 0.05 mm.

In one example, the susceptor 132 has a length of about 40 mm to 60 mm, about 40 mm to 45 mm, or about 44.5 mm.

In one example, the insulating member 128 has a wall thickness 156 of about 0.25 mm to 2 mm, 0.25 mm to 1 mm, or about 0.5 mm.

Figure 6:
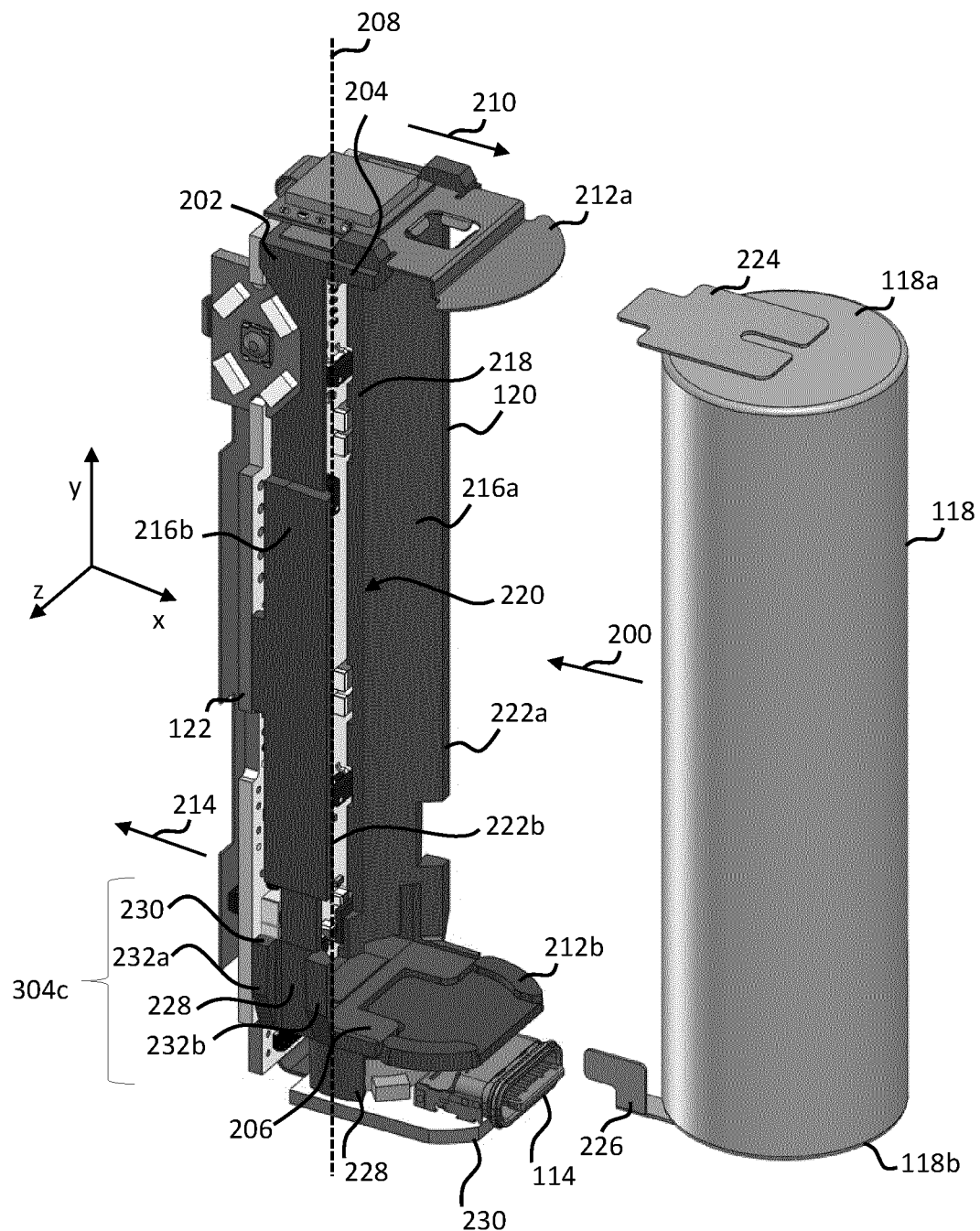
FIG. 6 shows a perspective view of a battery support and battery according to an embodiment.

FIG. 6 depicts the battery support 120 of FIGS. 2 and 4 in more detail. The battery support 120 comprises a main portion 202, a first end portion 204 and a second end portion 206. The main portion 202 defines a longitudinal axis 208, which is parallel to the y-axis. The first end portion 204 is arranged at a first end of the main portion 202 and the second end portion 206 is arranged at a second end of the main portion 202. The first and second end portions 204, 206 extend away from a first side of the main portion 202 in a first direction 210 substantially perpendicular to the longitudinal axis 208. The first side of the main portion 202 is therefore the side which faces outwards from the main portion 202 in the first direction 210. The first direction is parallel to the x-axis.

In this example the battery 118 is shown disconnected from the battery support 120. The battery 118 can be connected to the battery support 120 by moving the battery 118 towards the battery support 120 in the direction of arrow 200. When connected to the battery support 120, the battery 118 is held between the first and second end portions 204, 206. For example, a top end 118a of the battery 118 is received by the first end portion 204, and a bottom end 118b of the battery 118 is received by the second end portion 206. One or more end supports 212a, 212b may also be present to help secure the battery 118 in place. The end supports 212a, 212b may be integral with the first and second end portions 204, 206 such that they form part of the first and second end portions 204, 206, or they may be separate and be connected to the first and second end portions 204, 206.

FIG. 6 further depicts the PCB 122 engaged with a second side of the main portion 202. The second side of the main portion 202 is the side which faces outwards from the main portion 202 in a second direction 214, which is opposite, and parallel to the first direction 210. The second direction 214 is also parallel to the x-axis and perpendicular to the longitudinal axis 208. The PCB 122 may be adhered to the main portion 202 or may be connected via another means, such as friction fit, snap fit, etc. In this example, the PCB 122 defines a longitudinal axis which is parallel to the longitudinal axis 208 of the main portion 202.

As described above, the aerosol provision device 100 comprises a heater/heating assembly comprising at least one inductor coil 124, 126. FIG. 4 depicts the arrangement of the one or more inductor coils 124, 126 relative to the battery support. The heater assembly is positioned on the second side of the main portion 202, and the PCB 122 is positioned between the main portion 202 and the heater assembly. As shown in FIGS. 2 and 3, ends 130 of the one or more inductor coils 124, 126 can be connected to the PCB 122.

In the example of FIG. 6, the first side of the main portion 202 comprises two opposing side walls 216a, 216b and a base portion 218. In this particular example, the base portion 218 delimits an opening between the first side of the main portion 202 and the second side of the main portion 202, where the opening is positioned beneath the PCB 122. Thus, there is a hole/cut-out through the main portion 202 such that the base portion 218 is mainly a "void". This allows the underside of the PCB 122 to be accessed. The opening may comprise a plurality of through holes, rather than a single through hole. For example, the base portion may comprise one or more dividing structures 218a (shown in FIG. 8) which segment the opening into two or more through holes. Such dividing structure may provide additional rigidity, for example. In other examples, the base portion 218 is solid, so that there is no opening through the main portion 202.

The two side walls 216a, 216b extend along a length of the base portion 218 in a direction parallel to the longitudinal axis 208. The two side walls 216a, 216b also extend away from the base portion 218 in the first direction 210. Together the two side walls 216a, 216b and the base portion 218 define a receptacle 220. As shown most clearly in FIG. 4, once the battery 118 is connected to the battery support 120, the battery 118 is arranged at least partially in the receptacle 220 between the first and second end portions 204, 206 and between the two side walls 216a, 216b.

In some examples, at least part of the two side walls 216a, 216b abut the battery 118. For example, outer edges 222a, 222b of the two side walls 216a, 216b abut the battery 118 when the battery is connected to the battery support 120. In other examples, the battery 118 does not contact the edges 222a, 222b of the two side walls 216a, 216b.

In the example of FIG. 6, the two side walls 216a, 216b each comprise edges 222a, 222b that are shaped to conform to an outer surface of the battery 118. The battery in this example is cylindrical, and the edges 222a, 222b are curved to better secure the battery 118. The receptacle 220 may also have a shape which conforms to the outer surface of the battery 118. For example, the receptacle 220 may have a "U" shape to receive the battery 118.

As shown in FIG. 6, the battery 118 comprises a first electrically conductive member 224 in contact with a first battery terminal, and a second electrically conductive member 226 in contact with a second battery terminal. The first and second battery terminals can be positive or negative terminals, for example. The electrically conductive members 224, 226 may be wires or conductive strips which connect the battery 118 to the PCB 122. The electrically conductive members 224, 226 generally extend away from the battery 118 and towards the PCB 122 in the second direction 214.

When the battery 118 is connected to the battery support 120, the first and second electrically conductive members 224, 226 extend through the opening in the base portion 218 so that they can be connected to the PCB 122.

The PCB 122 may delimit a through hole through which the first electrically conductive member 224 extends. The PCB 122 may further delimit a second through hole through which the second electrically conductive member 226 extends. Thus, the PCB 122 may comprise one or more through holes to receive ends of the electrically conductive members 224, 226.

Figure 7:
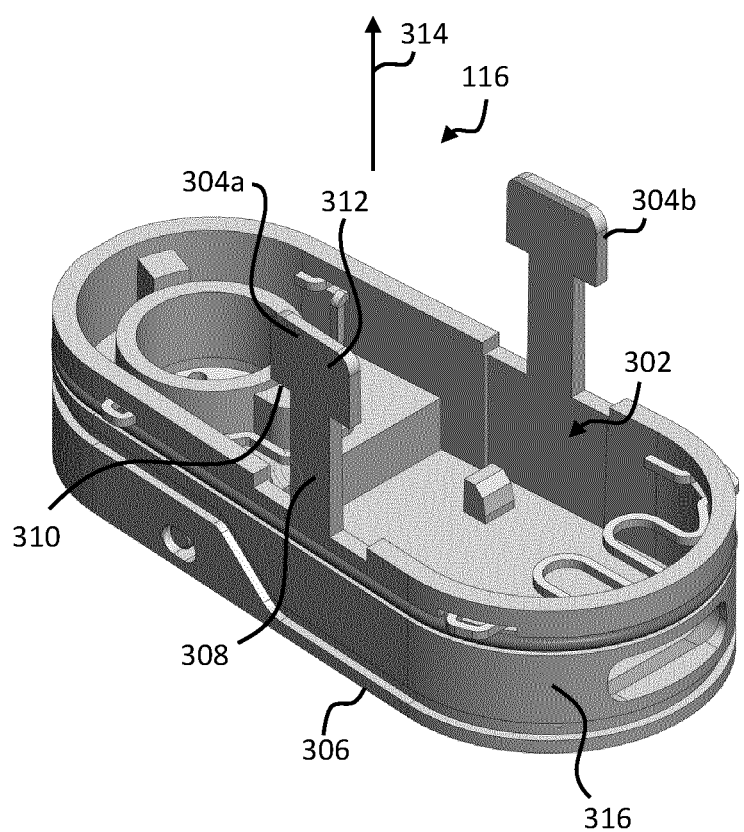
FIG. 7 shows a perspective view of an end member according to an embodiment.

A depicted in FIGS. 2 and 4, an end member 116 is arranged at one end of the device 100. FIG. 7 depicts the end member 116 in greater detail. As shown, the end member 116 defines a receptacle 302. The end member 116 also comprises at least one attachment element 304a, 304b which allows the end member 116 to be connected to the battery support 120. The end member 116 comprises an end surface 306 which defines part of an outer surface of the aerosol provision device 100. For example, the end surface 306 may form a bottom surface of the device 100.

When the end member 116 is connected to the battery support 120, the second end portion 206 of the battery support 120 and at least part of the heater assembly are received within the receptacle 302. For example, as shown in FIG. 4, the support 136 which engages one end of the susceptor 132 is received within the receptacle 302. FIG. 3 most clearly depicts the support 136 and the second end portion 206 positioned within the receptacle 302 once the device is assembled.

As mentioned, the end member 116 comprises at least one attachment element 304a, 304b. Similarly, the battery support 120 also comprises at least one attachment element. For example, as shown in FIG. 6, the battery support 120 comprises a second attachment element 304c which engages with the first attachment element 304a of the end member 116. This allows the end member 116 to be connected to the bottom end of the battery support 120.

In the example depicted, the main portion 202 comprises the second attachment element 304c, however the attachment element may be arranged anywhere on the battery support 120.

In this example, the first and second attachment elements 304a, 304c provide a snap-fit connection. For example, the second attachment element 304c comprises a channel 228 extending in a direction parallel to the longitudinal axis 208. The channel 228 may be provided by two side walls 232a, 232b. The second attachment element 304c further comprises a first surface 230 arranged at one end of the channel. The first surface 230 defines a plane arranged perpendicular to the longitudinal axis 208. The first surface 230 is defined by one or both of the upper surfaces of the two side walls 232a, 232b The first attachment element 304a comprises an elongate portion 308 extending away from the end surface 306, in a direction parallel to the longitudinal axis 208. The first attachment element 304a further comprises a second surface 310 arranged towards one end of the elongate portion 308. The second surface 310 defines a plane arranged perpendicular to the longitudinal axis 208. The second surface 310 is defined by one or both of the lower surfaces of an upper portion 312 of the first attachment element 304a. Thus, in this example, the first attachment element 304a is "T" shaped, where the underside of the horizontal bar in the "T" provides the second surface 310, and the upright part of the "T" provides the elongate portion 308.

When the end member 116 is moved towards the battery support 120, in a third direction 314 (parallel to the longitudinal axis 208), the first attachment element 304a engages the second attachment element 304c. Here the elongate portion 308 is received within the channel 228 and the first surface 230 and the second surface 310 engage. For example, the upper portion 312 of the first attachment element 304a contacts an inclined surface of the side walls 232a, 232b which causes the first attachment element 304a to bend outwards. As the upper portion 312 of the first attachment element 304a is moved beyond the upper surfaces of the two side walls 232a, 232b, the first attachment element 304a moves inwards again so that the first surface 230 and the second surface 310 abut each other. The channel 228 has a width greater than or equal to the width of the elongate portion 308, so the elongate portion 308 resides within the channel 228. Due to the opposing first surface 230 and second surface 310, the end member 116 cannot be separated from the battery support 120 without bending the first attachment element 304a outwards and lifting the upper portion 312 over the side walls 232a, 232b. FIG. 2 depicts the end member 116 connected to the battery support 120.

FIG. 7 further depicts a third, optional, attachment element 304b that is substantially the same as the first attachment element 304a. The third attachment element 304b can engage with a fourth attachment element located on an opposite side of the battery support 120.

FIGS. 2, 4, 6 and 7 depict one particular type of snap-fit attachment elements, however other snap-fit attachment elements may alternatively be used.

As described in relation to FIG. 1, the device 100 may further comprise an outer cover 102 which surrounds and houses various components of the device 100. The outer cover can surround the battery 118, the heater assembly, the battery support 120, and one or more side surfaces 316 of the end member 116. FIG. 7 depicts an end member 116 with a continuous side surface 316 which extends around the end member 116 and the longitudinal axis 208 (when the end member 116 is attached to the battery support 120). In other examples the end member 116 may have a square or rectangular footprint, such that there are four side surfaces which extend around the end member 116. The one or more side surfaces 314 extend away from the end surface 306 in the third direction 314. The end member 116, and/or the battery support 120 may comprise one or more attachment elements to hold the outer cover 102 in place.

In the present example, the outer cover 102 abuts the one or more side surfaces 316 of the end member 116, which can help retain the elongate portion 308 in the channel 228.

As previously mentioned the device 100 may comprise a further end member 106 arranged at the other end of the device 100, such that the outer cover 102 is received between the two end members 106, 116.

Figure 8:
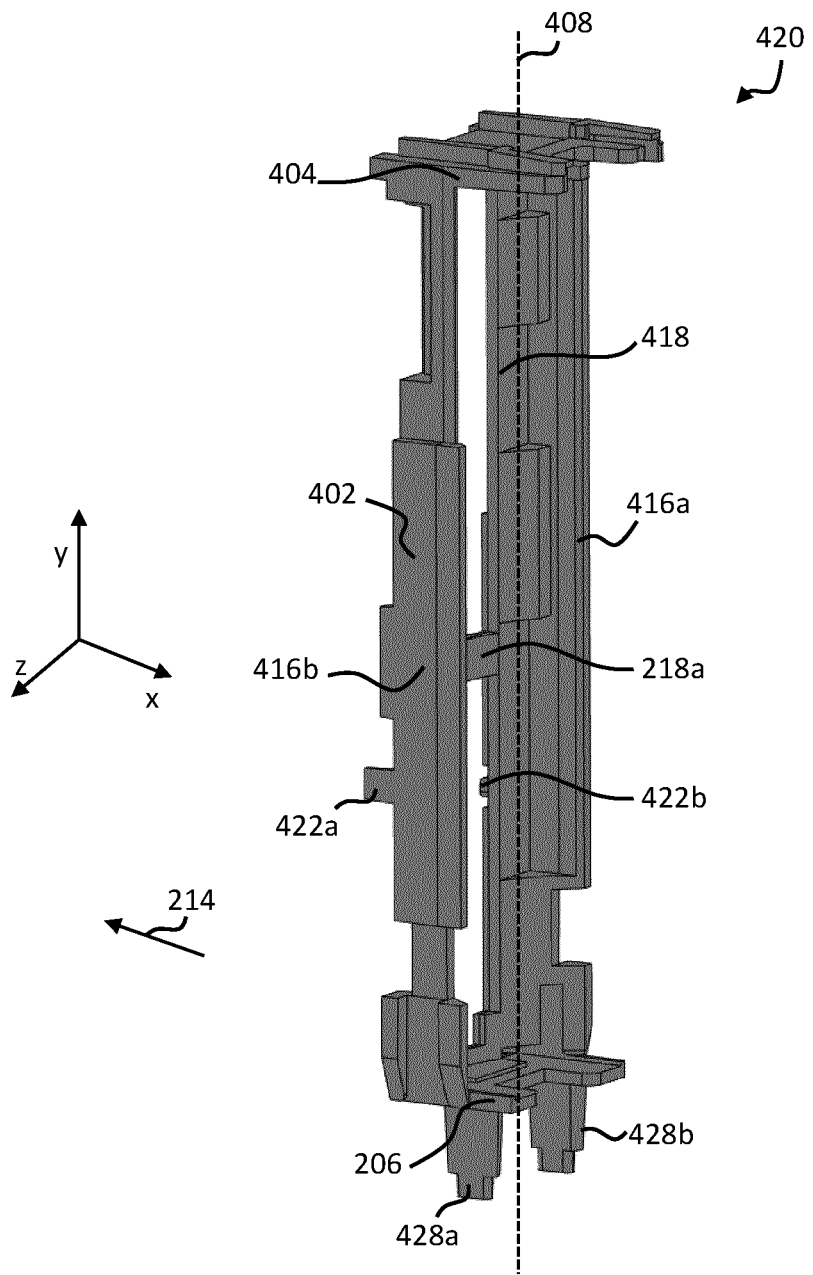
FIG. 8 shows a perspective view of a second battery support according to an embodiment.

FIG. 8 depicts an example of another battery support 420. The battery support 420 may comprise any or all of the features of the battery support 120, which are not described again for brevity. The battery support 420 can be used in the device 100 in place of battery support 120. Features of the battery support 420 described below can also be incorporated into the battery support 120.

The battery support 420 comprises a main portion 402, a first end portion 404 and a second end portion 406. The main portion 402 defines a longitudinal axis 408, which is parallel to the y-axis. The first side of the main portion 402 comprises two opposing side walls 416a, 416b and a base portion 418. The base portion 418 comprises an opening and one or more dividing structures 218a which segment the opening into two through holes.

Unlike the example battery support 120 described in FIG. 6, the battery support 420 of FIG. 8 further comprises a first PCB retaining member 422a and a second PCB retaining member 422b. The first and second PCB retaining members 422a, 422b both extend away from the second side of the main portion 402 in the second direction 214 and are arranged on opposite sides of the main portion 402. The first and second PCB retaining members 422a, 422b are configured to engage opposite sides of the PCB 122. For example, the PCB 122 may be received between the first and second PCB retaining members 422a, 422b to secure the PCB 122 in place. The PCB 122 may be held in place via friction fit, for example.

Figure 9:
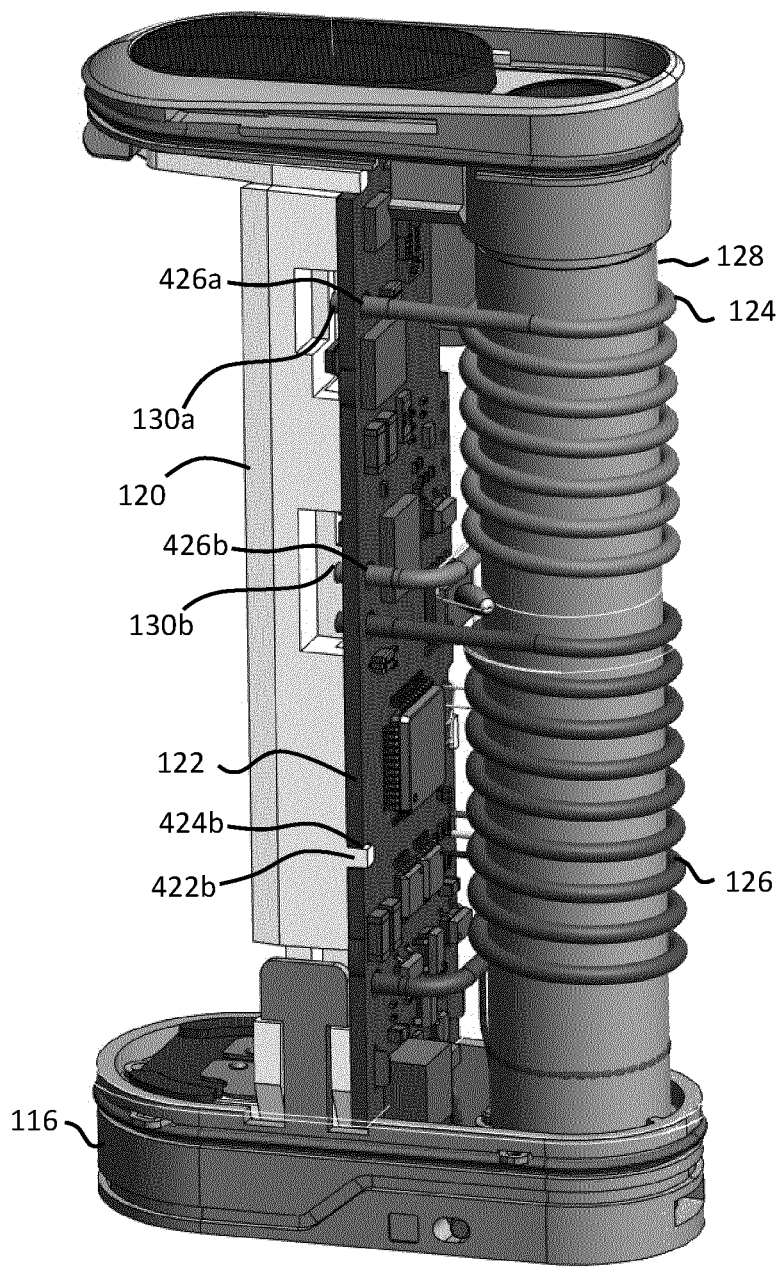
FIG. 9 depicts a portion of an aerosol provision device according to an embodiment.

FIG. 9 depicts a portion of the device 100, which includes the battery support 420 of FIG. 8. In this example, the end member 116 is connected to the battery support 116 via the attachment elements. In this example the first and second inductor coils 124, 126 have a circular cross section, rather than the rectangular cross section depicted in FIG. 2.

The PCB 122 comprises a first notch (obscured from view) to receive the first PCB retaining member 422a, and a second notch 424b to receive the second PCB retaining member 422b. The notches engage the retaining members 422a, 422b to better secure the PCB 122.

FIG. 9 more clearly depicts the ends 130 of the first and second inductor coils 124, 126 being connected to the PCB 122. The PCB can also delimit first and second inductor coil through holes 426a, 426b, where a first end 130a of the first inductor coil 124 extends through the first inductor coil through hole 426a, and a second end 130b of the first inductor coil 124 extends through the second inductor coil through hole 426b. The PCB can also delimit third and fourth inductor coil through holes, and a first end of the second inductor coil 126 may extend through the third inductor coil through hole, and a second end of the second inductor coil 126 may extend through the fourth inductor coil through hole.

Returning to FIG. 6, the main portion 202 may further comprise a first connector 228 and a second connector (obscured from view). The first and second connectors 228 extend away from either, or both of the first end portion 204 and the second end portion 206, in a direction parallel to the longitudinal axis 208. In FIG. 6, the first and second connectors 228 extend away from the second end portion 206. The device 100 further comprises a second PCB 230. The second PCB 230 may be associated with and be connected to the socket/port 114 for example. The second PCB 230 delimits first and second connector through holes, and the first connector 228 extends through the first connector through hole, and the second connector extends through the second connector through hole. The second PCB 230 can therefore be connected to the battery support 120 via the first and second connectors 228. In the example shown, the second PCB 230 is connected to the first PCB 122 via an electrically conductive track/wire. The second PCB 228 is arranged substantially perpendicular to the first PCB 122.

In one example, the second PCB 228 is held in place via friction fit as the first and second connectors 228 are inserted into the first and second connector through holes. In another example, the cross-sectional area of the ends of the first and second connectors 228 can be increased once the first and second connectors 228 have been inserted into the first and second connector through holes. This holds the second PCB 230 in place. The cross-sectional area can be increased by heating and melting the ends of the first and second connectors 228 for example. Alternatively, the ends of the first and second connectors 228 can be bent.

FIG. 8 depicts similar first and second connectors 428a, 428b. As in FIG. 6, each connector 428a, 428b has a first wide portion and a second narrower portion. The second PCB 230 can receive the first and second connectors 428a, 428b until the PCB 230 abuts the wider portion.

The above embodiments are to be understood as illustrative examples of the present disclosure. Further embodiments of the present disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure.

The invention claimed is:

1. An aerosol provision device, comprising:
a battery support, comprising:
a main portion defining a longitudinal axis,
a first end portion at a first end of the main portion along the longitudinal axis, and
a second end portion at a second end of the main portion along the longitudinal axis, wherein the first end portion and the second end portion extend away from a first side of the main portion in a first direction substantially perpendicular to the longitudinal axis;
a battery supported between the first end portion and the second end portion;
a heater assembly comprising a coil; and
a printed circuit board (PCB) engaged with a second side of the main portion and positioned between the main portion and the heater assembly, wherein ends of the coil are connected to the PCB,
wherein the PCB delimits a first coil though hole and a second coil through hole, wherein a first end of the coil extends through the first coil though hole and a second end of the coil extends through the second coil though hole.

2. The aerosol provision device according to claim 1, wherein:
the first side of the main portion defines a receptacle and comprises a base portion and two opposing side walls;
the two opposing side walls extend along a length of the base portion in a direction parallel to the longitudinal axis;
the two opposing side walls extend away from the base portion in the first direction; and
battery is arranged in the receptacle between the first end portion and the second end portion and the two opposing side walls.

3. The aerosol provision device according to claim 2, wherein at least part of the two opposing side walls abuts the battery.

4. The aerosol provision device according to claim 3, wherein the two opposing side walls each comprise edges that are shaped to conform to an outer surface of the battery, and the edges abut the battery.

5. The aerosol provision device according to claim 2, wherein the base portion delimits an opening between the first side of the main portion and the second side of the main portion, and the opening is positioned beneath the PCB.

6. The aerosol provision device according to claim 5, further comprising:
a first electrically conductive member in contact with a first battery terminal; and
a second electrically conductive member in contact with a second battery terminal;
wherein the first electrically conductive member and the second electrically conductive member extend through the opening and are connected to the PCB.

7. The aerosol provision device according to claim 6, wherein the PCB delimits a first through hole through which the first electrically conductive ember extends.

8. The aerosol provision device according to claim 1, further comprising:
an end member which:
defines a receptacle,
comprises a first attachment element, and
comprises an end surface which defines part of an outer surface of the aerosol provision device;
wherein:
the second end portion of the battery support and at least part of the heater assembly are positioned within the receptacle; and
the battery support comprises a second attachment element engaged with the first attachment element, such that the end member is connected to one end of the battery support.

9. The aerosol provision device according to claim 8, wherein: the main portion comprises the second attachment element, and the second attachment element comprises:
a channel extending in a direction parallel to the longitudinal axis, and
a first surface arranged at one end of the channel, wherein the first surface defines a plane arranged perpendicular to the longitudinal axis; and
the first attachment element comprises:
an elongate portion extending away from the end surface, and
a second surface arranged towards one end of the elongate portion, wherein the second surface defines a plane arranged perpendicular to the longitudinal axis; and
wherein the elongate portion is received within the channel and the first surface and the second surface engage.

10. The aerosol provision device according to claim 8, further comprising an outer cover, wherein:
the end member further comprises one or more side surfaces extending away from the end surface; and
the outer cover surrounds the battery, the heater assembly, the battery support, and the one or more side surfaces of the end member.

11. The aerosol provision device according to claim 1, wherein the second side of the main portion comprises a first PCB retaining member and a second PCB retaining member, wherein the first PCB retaining member and the second PCB retaining member:
both extend away from the second side of the main portion in a second direction which is opposite to the first direction; and are arranged on opposite sides of the main portion and engage opposite sides of the PCB.

12. The aerosol provision device according to claim 11, wherein the PCB comprises a first notch to receive the first PCB retaining member and a second notch to receive the second PCB retaining member.

13. The aerosol provision device according to claim 1, wherein the main portion comprises a first connector and a second connector extending away from one of the first end portion and the second end portion in a direction parallel to the longitudinal axis, wherein the device further comprises:
   a second PCB, wherein the second PCB delimits a first connector through hole and a second connector through hole, and the first connector extends through the first connector through hole, and the second connector extends through the second connector through hole.

14. An aerosol provision system, comprising:
   the aerosol provision device according to claim 1; and
   an article comprising aerosol generating material.

15. An aerosol provision device comprising:
   a battery support, comprising:
      a main portion defining a longitudinal axis;
      a first portion at a first end of the main portion along the longitudinal axis; and
      a second end portion at a second end of the main portion along the longitudinal axis,
   wherein the first and second end portions extend away from a first side of the main portion in a first direction substantially perpendicular to the longitudinal axis;
   a battery supported between the first and second end portions;
   a heater assembly, comprising a coil; and
   a first printed circuit board (PCB) on a second side of the main portion, wherein ends of the coil are connected to the first printed circuit board (PCB); and
   a second printed circuit board on the batter support, the second printed circuit board being connected to the first PCB and arranged substantially perpendicular to the first PCB.

* * * * *